United States Patent [19]

Jenczewski et al.

[11] Patent Number: 4,552,635

[45] Date of Patent: Nov. 12, 1985

[54] ELECTRODIALYTIC METHODS FOR REMOVAL OF SULFUR OXIDES FROM WASTE GASES

[75] Inventors: Theodore J. Jenczewski, Sherrill, N.Y.; William H. Skinner, Jr., Budd Lake, N.J.

[73] Assignee: Allied Corporation, Morris Township, Morris County, N.J.

[21] Appl. No.: 639,528

[22] Filed: Aug. 9, 1984

Related U.S. Application Data

[63] Continuation of Ser. No. 490,995, May 2, 1983, abandoned.

[51] Int. Cl.$^4$ ............................................. B01D 13/02
[52] U.S. Cl. .................................. 204/182.4; 204/301
[58] Field of Search ............................ 204/180 P, 301

[56] References Cited

U.S. PATENT DOCUMENTS 3,475,122 10/1969 McRae et al. .................. 204/180 P
4,041,129 8/1977 Foster et al. ...................... 423/234
4,107,015 8/1978 Chlanda et al. ................ 204/180 P Primary Examiner—Andrew H. Metz
Assistant Examiner—B. J. Boggs, Jr.
Attorney, Agent, or Firm—Gus T. Hampilos; Gerhard H. Fuchs

[57] ABSTRACT

Methods for removal of sulfur oxides, e.g., $SO_2$ and $SO_3$, from sulfuric acid tail gases by alkaline solution scrubbing, acidification of the alkaline scrubbing solution containing absorbed sulfur valves, liberation of concentrated $SO_2$ from the acidified solution and regeneration of the alkaline scrubbing solution by means of two- or three-compartment electrodialytic water splitters are disclosed. A completely closed loop method suitable for continuous removal of sulfur oxides from sulfuric acid tail gas, recovery of concentrated $SO_2$ for use in sulfuric acid plants, regeneration of alkaline scrubbing process solution and improvement in the water balance in sulfuric acid plant by use of two- and three-compartment electrodialytic water splitters is also disclosed.

23 Claims, 7 Drawing Figures

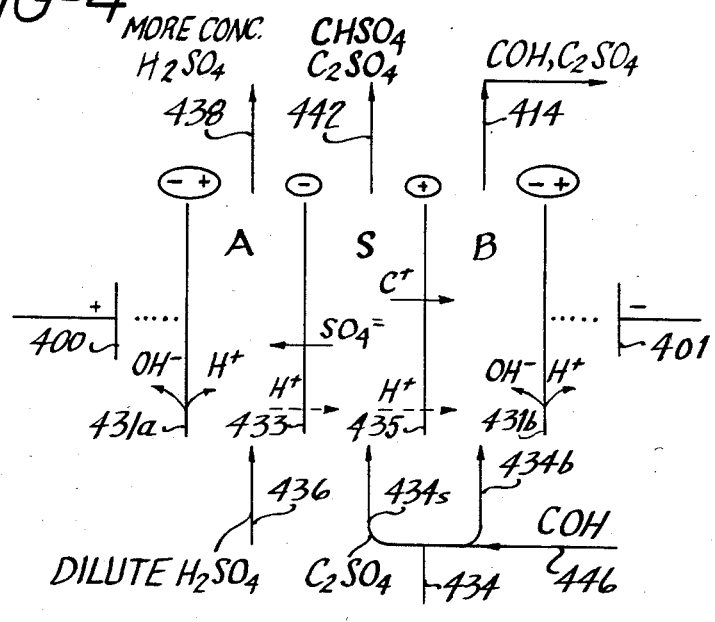
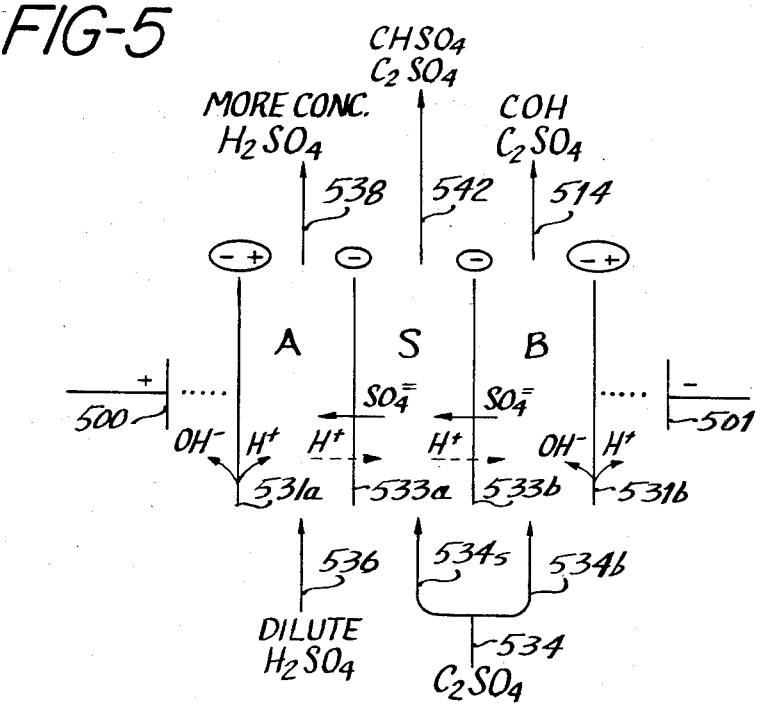

ELECTRODIALYTIC METHODS FOR REMOVAL OF SULFUR OXIDES FROM WASTE GASES

This application is a continuation of application Ser. No. 490,995 filed May 2, 1983 and now abandoned.

BACKGROUND OF THE INVENTION

This invention relates to methods for removing sulfur oxides from waste gases. More particularly, this invention relates to electrodialytic methods for removing sulfur oxides, e.g., $SO_2$ and $SO_3$, from waste gases recovering $SO_2$, and regenerating the process solution. A completely closed-loop electrodialytic method suitable for continuously removing sulfur oxides from sulfuric acid tail gases, recovering $SO_2$ for use in a sulfuric acid plants, regenerating the process solution and improving the water balance in a sulfuric acid plant is also contemplated.

Environmental considerations have placed stringent limits on emissions of sulfur oxides from stationary sources, e.g., utility plants and chemical plants. In response to the emissions limits, many processes have been developed which use alkaline scrubbing agents to remove sulfur oxides from waste gases from these plants. These processes include lime and limestone scrubbing, magnesium oxide scrubbing, sodium scrubbing with thermal regeneration (e.g., see U.S. Pat. Nos. 3,477,815 and 3,485,581,) sodium scrubbing with electrolytic regeneration [e.g., see U.S. Pat. Nos. 3,475,122, 3,523,880 and K. A. Meliere et al., "Description and Operation of the Stone & Webster/Ionics $SO_2$ Removal and Recovery Pilot Plant at the Wisconsin Electric Power Co. Valley Station in Milwaukee", U.S. EPA Report No. 650/2-74-1266 (1974)], ammonium scrubbing and electrodialytic concentration (e.g., U.S. Pat. Nos. 3,974,258, and 4,041,129) and catalytic oxidation processes. Other processes have been reviewed by A. V. Slack of Noyes Data Corp., Park Ridge, N.J. ["Sulfur Dioxide Removal from Waste Gases" Pollution Control Review No. 4 (1971)], and N. Kaplan and M. A. Maxwell "Removal of $SO_2$ from Industrial Waste Gases", *Chemical Engineering*, Vol. 84, No. 22, p. 127–135 (Oct. 17, 1977).

The Welman-Lord process has been developed for use at both power plants and sulfuric acid plants. See "Welman-Lord $SO_2$ Recovery Process—Flue Gas Desulfurization, U.S. EPA Report No. 625/2-77-011 (1977). This process produces a sodium bisulfite liquor which is treated to yield $SO_2$ and sodium sulfate. However, the treating step a costly vacuum evaporation step to convert sodium bisulfite liquor into $SO_2$ and sodium sulfate.

Electrolysis, as disclosed in U.S. Pat. No. 3,475,122, 3,523,880, 3,974,258 and 4,041,129, is not a very efficient process. For the production of acid and base from salt and water, electrolytic processes generate $H^+$ and $OH^-$ ions at the electrodes only and, at the same time, generate $H_2$ and $O_2$ (or other electrode oxidation and reduction products). Thus, each equivalent of $H^+$ and $OH^-$ generated results in an equivalent amount of $H_2$ and $O_2$ (or other oxidation and reduction products) being produced. This significantly reduces the rate of production of acid and base.

Electrodialytic water splitting, on the other hand, generates $H^+$ and $OH^-$ ions from each of several bipolar membranes positioned between the electrodes without forming $H_2$ and $O_2$ (except for the relatively limited quantities of $H_2$ and $O_2$ at the electrodes which are the only places where oxidation-reduction is taking place). Therefore, oxidation-reduction products ($H_2$ and $O_2$) are formed in only small amounts relative to the total amount of $H^+$ and $OH^-$ formed. Thus, the process of electrodialytic water splitting requires less energy than an electrolysis process to produce acid and base from salt and water.

Recently, electrodialytic water splitting processes have been employed to remove $SO_2$ from water gases. See U.S. Pat. Nos. 4,082,835 and 4,107,015. Both processes involve the production of sodium bisulfite liquor which is treated to produce $SO_2$ and sodium sulfite. However, the sodium sulfate produced by the processes from the oxidation of $SO_2$ to $SO_3$ must be purged from the system and treated separately.

SUMMARY OF THE INVENTION

We have discovered a method for removing and recovering sulfur oxides from (sulfuric acid tail gases, in particular), gases and regenerating the process liquors which comprises the steps of:

(a) contacting, in a first reaction zone, gases containing $SO_2$ and $SO_3$ with a liquid comprising aqueous hydroxide to produce an aqueous salt solution containing aqueous soluble sulfites, bisulfites and sulfates, and a gas comprising water vapor and depleted in $SO_2$ and $SO_3$;

(b) contacting, in a second reaction zone, said aqueous salt solution with a liquid comprising sulfuric acid and water to form an aqueous solution comprising sulfurous acid and aqueous soluble sulfates;

(c) separating the sulfurous acid from said aqueous solution by liberating $SO_2$ as a gas therefrom;

(d) providing an electrodialytic water splitter comprising at least one unit cell, each unit cell comprising an acid and a base compartment;

(e) feeding the liquid comprising aqueous soluble sulfates to the base compartment of the electrodialytic water splitter;

(f) feeding a liquid comprising dilute aqueous sulfuric acid to the acid compartment of said electrodialytic water splitter;

(g) passing current through said electrodialytic water splitter to produce a liquid enriched in sulfuric acid in the acid compartment and said liquid comprising aqueous soluble hydroxide in the base compartment;

In addition, the method also includes the features of forwarding at least a portion of the liquid enriched in sulfuric acid to said second reaction zone and; forwarding said liquid comprising aqueous soluble hydroxide to said first reaction zone.

There is further provided a method for removing and recovering $SO_2$ and $SO_3$ from gases, and regenerating process liquors which comprises the steps of:

(a) contacting, in a first reaction zone, gases containing $SO_2$ and $SO_3$ with a reaction liquid comprising aqueous hydroxide to produce an aqueous salt solution containing soluble sulfites, bisulfites, and sulfates, and a gas comprising water vapor and depleted in $SO_2$ and $SO_3$;

(b) contacting, in a second reaction zone, said aqueous salt reaction liquid with a solution comprising sulfuric acid and water to form an aqueous acid solution comprising sulfurous acid and aqueous soluble sufates;

(c) separating the sulfurous acid from said aqueous solution by liberating $SO_2$ as a gas therefrom;

(d) providing an electrodialytic water splitter comprising at least one unit cell, each unit cell comprising an acid, base and a salt compartment;

(e) feeding at least a portion of said liquid comprising aqueous soluble sulfate to the salt compartment of the three-compartment electrodialytic water splitter;

(f) feeding a liquid comprising water to the base compartment of said electrodialytic water splitter;

(g) feeding a liquid comprising dilute aqueous sulfuric acid to the acid compartment of said electrodialytic water splitter;

(h) passing current through said electrodialytic water splitter to produce a liquid enriched in sulfuric acid in the acid compartment; a liquid comprising aqueous hydrogen ions and soluble sulfate in the salt compartment, and a liquid comprising aqueous soluble hydroxide in the base compartment;

(h) forwarding the liquid comprising aqueous soluble hydroxide to the first reaction compartment; and (i) forwarding the liquid enriched in sulfuric acid to the second reaction zone.

The foregoing process can employ any of three different electrodialytic water splitters, one having a two-compartment unit cell, and two distinct electrodialytic water splitters having different three-compartment unit cells.

The two-compartment electrodialytic splitter comprises alternating bipolar and anion permselective membranes. The liquid comprising aqueous soluble sulfate is fed to a base zone formed by an anion permselective face of a bipolar membrane and a face of an anion permselective membrane to produce the liquid comprising aqueous soluble hydroxide and the liquid comprising dilute aqueous sulfuric acid is fed to an acid zone formed by a cation permselective face of a bipolar membrane and a face of an anion permselective membrane to produce a liquid enriched in sulfuric acid.

One of the three-compartment electrodialytic water splitters, comprises alternating bipolar, anion permselective and cation permselective membranes thereby forming alternating acid, salt and base zones. At least a portion of the liquid comprising the aqueous soluble sulfate is fed to a salt compartment formed by a face of an anion permselective membrane and by a face of a cation permselective membrane to produce a liquid comprising hydrogen ions and soluble sulfate. A liquid comprising water is fed to base zones formed by a face of a cation permselective membrane and an anion permselective face of a bipolar membrane and to produce a liquid comprising soluble hydroxide. The liquid comprising dilute aqueous sulfuric acid is fed to the acid zones formed by a cation face of a bipolar membrane and a face of an anion permselective membrane to produce a liquid enriched in sulfuric acid.

The other three-compartment electrodialytic water splitter at least one unit cell comprising a is comprised of bipolar and two anion permselective membranes thereby forming alternating acid, salt and base compartments. The liquid comprising aqueous soluble sulfate is divided into two portions, one portion being fed to a salt compartment formed by faces of two anion permselective membranes, the other portion being fed to the base compartment formed by a face of an anion permselective membrane and anion permselective face of a bipolar membrane. The liquid comprising dilute aqueous sulfuric acid is fed to the acid compartment formed by a cation face of a bipolar membrane and a face of an anion permselective membrane.

BRIEF DESCRIPTION OF THE DRAWINGS

FIG. 4 schematically illustrates the operation of a three-compartment electrodialytic water splitter used in a preferred embodiment of the present invention.

FIG. 5 schematically illustrates the operation of a three-compartment electrodialytic water splitter used in an alternative preferred embodiment of the present invention.

DETAILED DESCRIPTION OF THE INVENTION

Figure 1:
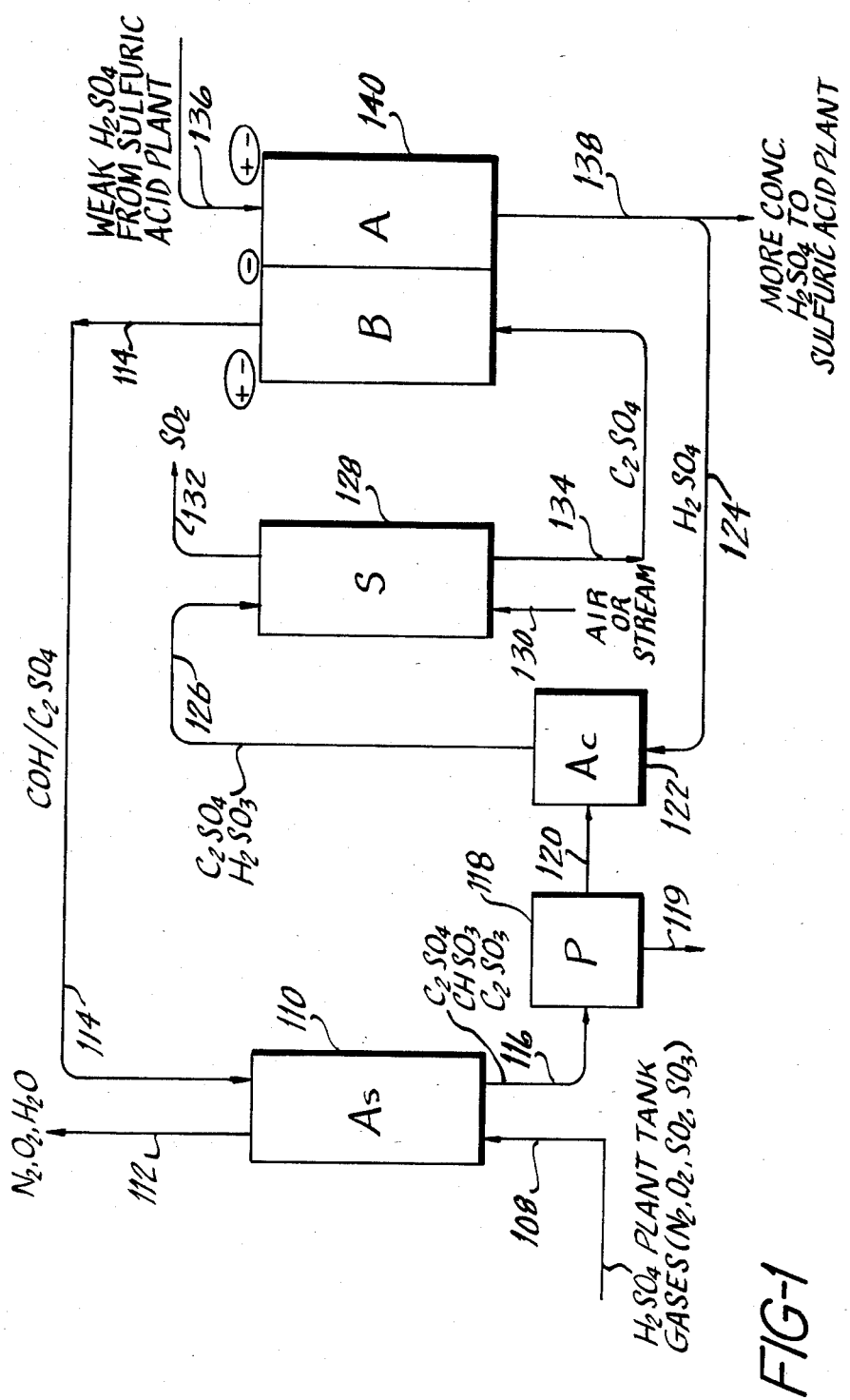
FIG. 1 schematically illustrates an embodiment of the present invention operated with a two-compartment electrodialytic water splitter.

The present invention is directed to a process which employs electrodialytic water splitters. The process controls emissions of sulfur oxides, i.e., $SO_2$ and $SO_3$, contained in waste gases such as tail gases from sulfuric acid plants. Typically, such plants are operated at lead or copper smelters to produce so-called smelter acid, or at conventional sulfuric acid plants. Application of the process of the present invention at a sulfuric acid plant has distinct advantages. The electrodialytic process operates at high current efficiency, low cell voltage and as a completely closed loop process (i.e., no by-products to treat or dispose of). Our process reduce sulfur oxide emissions to acceptable environmental limits while simultaneously and unexpectedly improving the water balance of the sulfuric acid plant process streams.

In accordance with the process, a scrubbing liquid comprising soluble hydroxides such as ammonia, (optionally containing the corresponding sulfate) sodium hydroxide, potassium hydroxide or lithium hydroxide, is used in a first reaction zone to scrub sulfur dioxide and sulfur trioxide from sulfuric acid plant tail gases. a solution comprising ammonia and ammonium sulfate is preferred for our process. The scrubbing liquid reacts with the sulfur dioxide and sulfur trioxide to produce a solution comprising soluble sulfites, bisulfites and sulfates, and a gas comprising water vapor and depleted in sulfur oxides. The spent scrubbing liquid (scrubbing liquor) is acidified, in a second reaction zone, with aqueous sulfuric acid obtained from an acid compartment of a two- or three-compartment electrodialytic water splitter and the resulting solution of soluble sulfate and sulfurous acid is stripped of the dissolved $SO_2$ with air or steam. The sulfur is preferably recycled to a sulfuric acid plant. The resulting aqueous soluble sulfate solution is converted into sulfuric acid and aqueous soluble hydroxide by two- or three-compartment electrodialytic water splitting. The aqueous soluble hydroxide (which may optionally contain aqueous soluble sulfate) is recycled to the first reaction zone. A liquid comprising dilute aqueous sulfuric acid, generally containing about 1 to about 8%, commonly about 2 to 3% sulfuric, more commonly about 2.5% by weight sulfuric, is fed to the acid zone of a two- or three-compartment water splitter to produce a more concentrated aqueous sulfuric acid solution, normally a 2 to about 10% by weight, preferably about 6 to 8% by weight sulfuric acid. A portion of the more concentrated aqueous sulfuric acid obtained from the acid compartment, which corresponds to the amount of sulfur trioxide in the tail gas, is recycled to the sulfuric acid plant in a preferred embodiment of the present invention. The remainder of the more concentraed aqueous sulfuric acid solution is forwarded for use as the acidifier in the second reaction zone.

A liquid comprising aqueous soluble sulfate is fed to the base compartment of the electrodialytic water splitter. In the two-compartment electrodialytic water splitter, the liquid may optionally contain aqueous soluble hydroxide, for example, ammonium hydroxide or sodium hydroxide, which may be added from an external source or preferably by recycling a portion of the liquid product removed from the base compartment. When a three-compartment electrodialytic water splitter comprised of alternating bipolar and two anion permselective membranes is employed the liquid comprises a portion of the aqueous soluble sulfate removed from the stripper (the third reaction zone) and, preferably, the sulfate is ammonium or sodium sulfate. The feed to the base compartment of the three-compartment electrodialytic cell illustrated in FIG. 4 comprising alternating bipolar, anion and cation membranes, preferably further includes at least a dilute solution of sodium hydroxide preferably added such as by recycling a portion of the liquid product withdrawn from said base compartment: however, when ammonium sulfate is fed to the base compartment of the cell no additional hydroxide need be added.

The feed to the salt compartment of the three-compartment electrodialytic water splitter. is at least a portion of the liquid comprising aqueous soluble sulfate removed from the stripper. Aqueous ammonium sulfate and aqueous sodium sulfate are preferred feed solutions with, aqueous sodium sulfate being more preferred.

The liquid withdrawn from the base compartment of the electrodialytic water splitter comprises aqueous soluble hydroxide and, preferably, aqueous soluble sulfate. An aqueous solution of ammonium hydroxide containing about 1 to 10% by weight ammonium hydroxide and about 5 to 10% by weight ammonium sulfate is preferentially produced in the base compartment of the two compartment electrodialytic water splitter and fed to the scrubber. In the base compartment of the three-compartment electrodialytic water splitter, the liquid product comprises aqueous soluble hydroxide and optionally contains aqueous soluble sulfate. In a preferred embodiment of the present invention, aqueous soluble sodium hydroxide is removed from the base compartment and fed to the scrubber. In another preferred embodiment, a liquid comprising aqueous ammonium hydroxide and aqueous ammonium sulfate, normally about 1 to about 8% by weight aqueous ammonium hydroxide and about 5 to about 10% by weight aqueous ammonium sulfate, is produced in the base compartment, withdrawn and forwarded to the scrubber.

The liquid produced in the salt compartment of the three-compartment electrodialytic water splitter comprises sulfuric acid and aqueous soluble sulfate which is then forwarded to the acidification step. In a preferred embodiment, the liquid comprises aqueous sodium sulfate and sulfuric acid. In another preferred embodiment, the liquid produced in the salt compartment comprises aqueous ammonium sulfate (normally about 10 to 15% by weight aqueous sodium ammonium sulfate) and about 1 to 5% by weight aqueous ammonium hydrogen sulfate, and is forwarded to the acidification step.

The process of the present invention may be better understood by reference to the accompanying drawings. In FIG. 1, sulfuric acid tail gases, containing for example, $N_2$, $O_2$, $SO_2$ and $SO_3$, enter an absorber 110 via a line 108 wherein the gases contacted with aqueous soluble hydroxide. The aqueous soluble hydroxide, for example, NaOH, KOH, LiOH or $NH_4OH$ ($NH_3$) and optionally containing aqueous soluble sulfate, is supplied by transferring the liquid product from the base compartment B of a two-compartment water splitter 140 via a line 114. An aqueous salt solution is formed in the absorber 110 containing aqueous soluble sulfites (bisulfites and sulfates, for example, ammonium sulfate, ammonium hydrogen sulfite and ammonium sulfite) and a gas comprising water vapor and depleted in $SO_2$ and $SO_3$. The gas is removed from the absorber 110 by a line 112. Ammonium is the cation used in the description below; however, it is merely an example of one of the usable hydroxides. The absorber 110 may be a packed tower, a tray absorption tower or other devices known to those skilled in the art. In the absorber 110, the amount of $SO_2$ is removed is sufficient to yield a gas exiting the absorber 110 which contains a small enough amount of sulfur oxides so as not to pose an environmental hazard.

The aqueous salt solution produced in the absorber will comprise [normally consists essentially of $NH_4HSO_3$, $(NH_4)_2SO_3$ and $(NH_4)_2SO_4$]. Typically, the solution will contain about 0.1 to about 15% by weight percent $(NH_4)_2SO_3$, about 0.1 to about 15% by weight $(NH_4)_2SO_4$ and about 0.1 to about 10% by weight $(NH_4)_2SO_3$ (or weight percent). The exact composition of the solution will depend on the composition of the tall gases and the aqueous soluble hydroxide, the design of absorber the 110, the degree of $SO_2$ and $SO_3$ removal sought, and the amount of sulfur values such as sulfite, converted by oxidation into sulfate. The solution of aqueous salts is removed via a line 116 and fed to a purification zone 118 for removal of cations (e.g., calcium and magnesium), which may interfere with the operation of the electrodialytic water splitter 140.

The purified solution of aqueous soluble salts flows through a line 120 and is fed to a second reaction zone 122 wherein it is contacted with a dilute aqueous solution of sulfuric acid. The dilute aqueous solution normally contains about 2 to about 10% by weight, preferably about 6 to 8% by weight, sulfuric acid and is obtained from the acid compartment A of the two-compartment electrodialytic water splitter 140. During the acidification step in the second reaction zone 122, the aqueous soluble sulfites and bisulfites are converted into a liquid comprising aqueous sulfurous acid (aqueous $SO_2$) and aqueous ammonium sulfate. The aqueous ammonium sulfate is removed from the second reaction zone 122 via a line 126 and is supplied to a stripper (third reaction zone) 128 for contact with air or steam fed by a line 130 to the stripper 128. Essentially pure $SO_2$ is produced in and removed from 128 via a line 132.

In a preferred embodiment of the present invention, the $SO_2$ in the line 132 is forwarded to a sulfuric acid plant for conversion into sulfuric acid. A liquid comprising aqueous soluble ammonium sulfate, normally about 11% by weight ammonium sulfate, is removed from the stripper 128 via a line 134 and forwarded to the base compartment B of the two-compartment electrodialytic water splitter 140. A liquid comprising dilute sulfuric acid obtained from a sulfuric acid plant, normally about 1 to about 8% by weight and preferably about 2 to about 3% by weight sulfuric acid, is fed along a line 136 to the acid compartment A of the two-compartment electrodialytic water splitter 140.

A liquid enriched in sulfuric acid is withdrawn from the acid compartment via a line 138. At least a portion of the enriched liquid from the acid compartment A is forwarded via a line 124 to the second reaction zone 122. The remainder of the enriched liquid is returned via a line 138 to a sulfuric acid plant. The composition of the aqueous sulfuric acid solution removed via the line 138 is normally about 2 to about 10% by weight, preferably about 6 to 8% by weight, sulfuric acid.

A large portion of the aqueous sulfuric acid product in the line 138 is recycled via a line 124 for acidification of spent scrubber solution in the second reaction zone 122. The water in the aqueous sulfuric acid product is eventually removed as it is recycled to the absorber 110 with the aqueous soluble hydroxide. The water and aqueous soluble hydroxide are removed as product solution from the base compartment B via a line 114. Removal of the water is accomplished by evaporation in the absorber 110 and ejection to the atmosphere via a line 112. Thus, water in the dilute sulfuric acid feed is removed from the sulfuric acid plant by evaporation through direct contact with the hot sulfuric acid plant tail gases. Consequently, by operating in accordance with this process, a higher production rate of oleum and $SO_3$ in the sulfuric acid plant is obtained because the sulfuric acid plant operates at a higher $SO_2/H_2O$ ratio.

Figure 3:
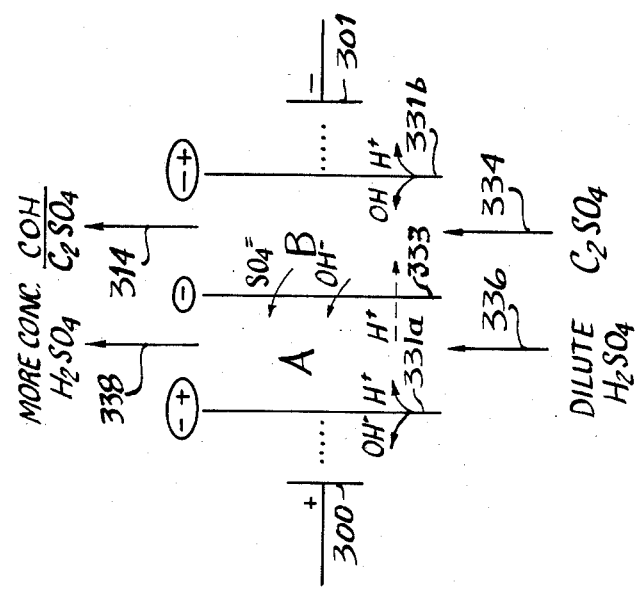
FIG. 3 schematically illustrates the operation of a two-compartment electrodialytic water splitter used in a preferred embodiment of the present invention.

The two-compartment water splitter described in FIG. 1 is illustrated in detail in FIG. 3. A plurality of bipolar ion exchange membranes 331a and 331b, and anion permselective membranes 333 are arranged in an alternating fashion between two electrodes 300 and 301 to define an electrodialysis stack. The construction of an electrodialytic stack is well known and, for example, units are available commercially from Asahi Glass Co., 1-2, Marunochi 2-chome, Chiyoda-ku, Tokyo, Japan; Ionics, Inc., Watertown, Mass. and other commercial sources. In addition, stacks which are suitable for electrolyte concentration such as the Asahi Model CU-IV, may also be used for the water splitter. However, the bipolar membrane used therein must be of a kind adaptable to water splitting.

While the use of bipolar membranes is preferred because of the simplicity of equipment, the water splitting operation may be carried out by using a third compartment containing anions or cations incapable of passing through the anion and cation membranes on either side of the compartment as described, for example, in U.S. Pat. Nos. 3,704,218 and 3,705,846. This arrangement, when used for water splitting, operates by the same principles as the bipolar membrane.

The two-compartment water splitter (or its equivalent) illustrated in FIG. 3 converts water into hydrogen and hydroxyl ion. The water splitter employs suitable bipolar membranes that can be of the type described, for example, in U.S. Pat. No. 2,829,095, (which has reference to water splitting generally) in U.S. Pat. No. 4,024,043 (single film bipolar membrane); in U.S. Pat. No. 4,116,889 (cast bipolar membrane); or any other type which effectively converts water into hydrogen and hydroxyl ions. The anion permselective membranes may be weakly basic or strongly basic anion permselective membranes such as commercially available from Asahi Glass Co. or Ionics, Inc., Watertown, Mass. A particularly useful anion exchange membrane is the anion membrane AMV strongly basic anion permselective membrane manufactured by Asahi Glass Co.; but other commercially available anion membranes may also be used.

The current passed through the electrodialytic water splitter in a conventional fashion is direct current of a voltage dictated by design and performance characteristics readily apparent to the skilled artisan and/or determined by routine experimentation.

The operation of the two-compartment electrodialytic water splitter is described herein The electrodialytic water splitter is conveniently operated at any temperature between about 20° C. and 80° C. A direct current passes from the anode 300 to the cathode 301. A line 336 which contains dilute sulfuric acid is fed to the acid compartment labeled A. In the acid compartment A, hydrogen ion ($H^+$) from the cation faces of a bipolar membranes 331a and 331b are introduced. At the same time, aqueous soluble sulfate is fed via a line 334 to a base compartment B. In the base compartment B, hydroxide (ions $OH^-$) from anion faces of the bipolar membranes 331a and 331b are introduced. At the same time, hydroxide ($OH^-$) and sulfate ($SO_4^{--}$) ions migrate through an anion permselective membrane 333 from the base compartment to the acid compartment and hydrogen ions ($H^+$) migrate through the anion permselective membrane 333 from the acid compartment A to the base compartment B. A more concentrated sulfuric acid solution is produced in acid compartment A and is removed therefrom via a line 338. In addition a solution comprising ammonium hydroxide and a ammonium sulfate is produced in the base compartment B and is removed therefrom via a line 314. In one embodiment (not shown) at least a portion of the ammonium hydroxide removed via the line 314 may be recycled back to the line 334. The composition of the base in the base compartment B will, therefore, depend on the relevant amounts of base from the line 314 recycled to line 334 and any make-up water in line 334 added to the introduced into the compartment B, as well as the relative amount of sulfate which migrates through the anion membrane 333 into the acid compartment A Normally the composition of the base is about 7 to 15%, preferably 7 to 10%, by weight ammonium sulfate containing about 1 to 5% by weight ammonium hydroxide. The conversion of the solutions in the lines 336 and 334 may be made in a single pass through the stack, by a feed and bleed apportionment method, or by passing the solutions through a series of stacks so as to maximize the efficiency of the process.

Figure 2:
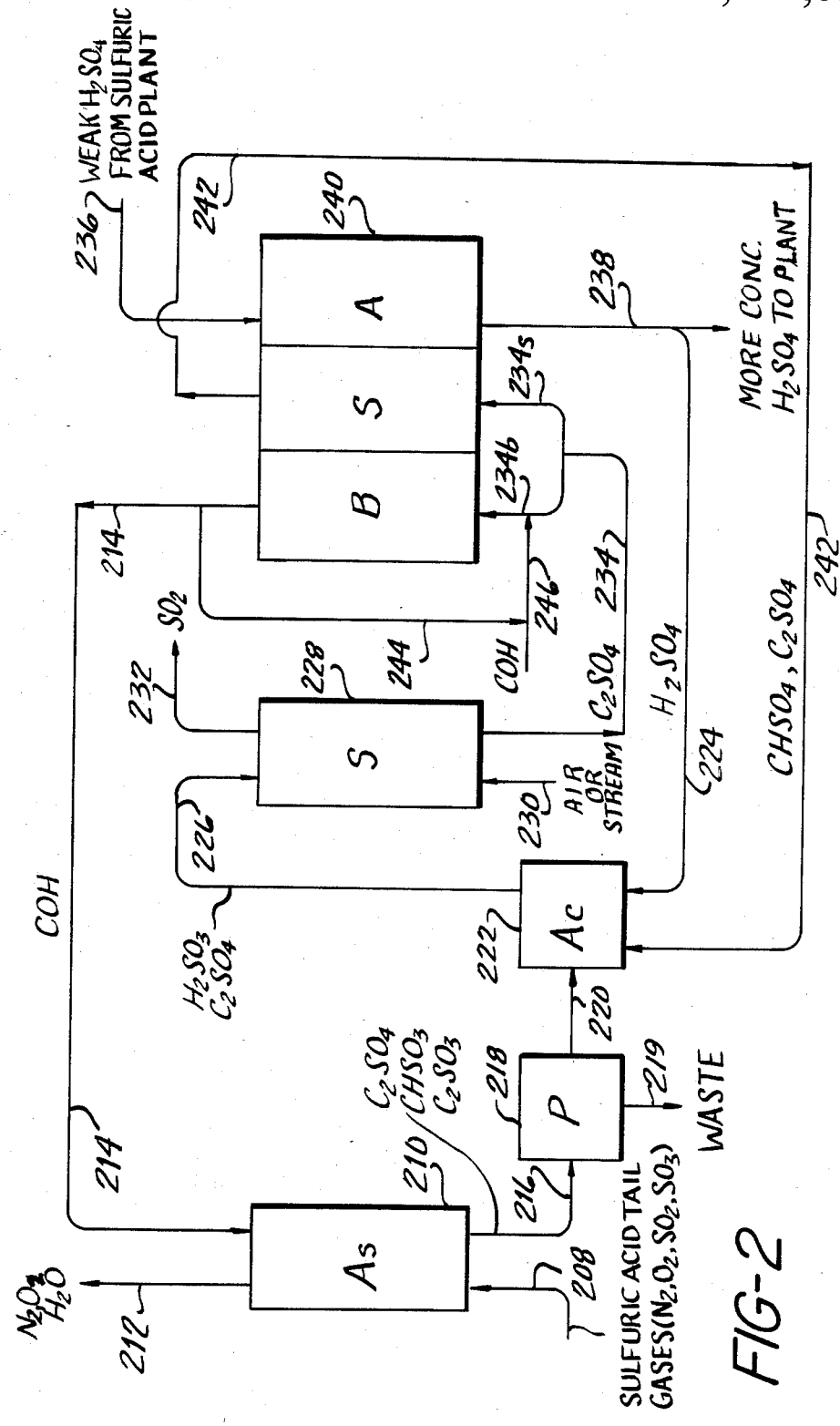
FIG. 2 schematically illustrates a preferred embodiment of the present invention operated with a three-compartment electrodialytic water splitter.

Another embodiment of the present invention is operated with a three-compartment electrodialytic water splitter. As illustrated in FIG. 2, sulfuric acid tail gases from a line 208 are contacted with an aqueous ammonium hydroxide and ammonium sulfate solution fed to an absorber 210 via a line 214. The reactions in absorber 210 are analogous to those in absorber 110 described in FIG. 1. A gas comprising water vapor and depleted in $SO_2$ and $SO_3$ is removed from the absorber 210 via a line 212. An aqueous salt solution comprising ammonium sulfate, ammonium hydrogen sulfite and ammonium sulfite is removed from the absorber 210 via a line 216. A purification zone 218 is provided to remove impurities and divalent cations, such as calcium and magnesium, from the solution of salts removed from the absorber 210 which may interfere with the operation of the electrodialytic water splitter 240. The purified aqueous ammonium salts solution is removed via a line 220 and is fed to an acidification zone 222 for contacting with a solution containing aqueous ammonium hydrogen sulfate and aqueous ammonium sulfate removed via a line 240 from a salt compartment S of the three-compartment water splitter 240. In addition, at least a portion of a more concentrated sulfuric acid enriched solution, (produced in an acid compartment A) is supplied via lines 238 and 224 to the acidification zone 222. In the acidification zone, reactions completely analogous to those occurring in the acidification zone 122 in FIG. 1 occur to produce an aqueous solution of sulfurous acid (aqueous $SO_2$) and aqueous ammonium sulfate which is removed from the acidification zone 222 via a line 226. The composition of the solution removed from the acidification zone is normally about 8 to about 15% by weight sulfurous acid and about 10 to 20% by weight (preferably about 14% by weight) ammonium sulfate. The solution is fed to a stripper 228 for contact with air or steam supplied via line 230 to form a gas stream containing $SO_2$ which is removed via a line 232 and an aqueous ammonium sulfate solution which is removed via a line 234. In a preferred embodiment the $SO_2$ removed via the line 232 is forwarded to a sulfuric acid plant for conversion into $SO_3$ and/or sulfuric acid.

At least a portion of the aqueous ammonium sulfate solution in the line 234, is fed to the salt compartment S of the electrodialytic cell 240 via a line 234s. An acidified ammonium sulfate solution containing ammonium hydrogen sulfate and ammonium sulfate, normally about 1 to 5% by weight ammonium hydrogen sulfate and about 8 to 15% by weight ammonium sulfate, is produced at the salt compartment S of the three-compartment electrodialytic water splitter 240, removed via a line 242 and forwarded to the acidification zone 222. Water from a line 246 is fed via a line 234b to the base compartment B of the three-compartment electrodialytic water splitter 240. In a preferred embodiment, the remainder of the aqueous ammonium sulfate solution in the line 234 is fed via a line 234b to the base compartment B. A liquid comprising aqueous ammonium hydroxide and aqueous ammonium sulfate is removed from the base compartment B via a line 214 and is forwarded to the absorber 210. At least a portion of the material removed via the line 214 may be recycled via a line 244 and the line 246 to the base compartment B. Dilute aqueous sulfuric acid obtained from a sulfuric acid plant is fed by a line 236 to the acid compartment A. The concentration of the sulfuric acid in the line 236 is normally about 1 to 8% preferably about 2 to 3% by weight sulfuric acid. A solution enriched in sulfuric acid normally containing about 2 to 10%, preferably about 6 to 8% by weight sulfuric acid, is produced in the acid compartment A and removed via a line 238. At least a portion of the enriched sulfuric acid solution in the line 238 is returned to a sulfuric acid plant and the remainder is forwarded via a line 224 to the acidification reaction zone 222.

The three-compartment electrodialytic water splitters found useful in the embodiment illustrated in FIG. 2 are detailed in FIGS. 4 and 5. FIG. 4 illustrates a three-compartment electrodialytic water splitter which incorporates a plurality of bipolar, anion permselective and cation permselective membranes arranged in alternating fashion to provide alternating acids, salt and base compartments positioned between two electrodes thereby forming an electrolytic stack. The anion and bipolar ion exchange membranes employed in the three-compartment electrodialytic water splitter of FIG. 4 are exactly analogous to those described in connection with the two-compartment water splitter illustrated in FIG. 3. The cation permselective membranes may be weakly acidic or strongly acidic cation permselective membranes. Particularly useful, membranes include strongly acidic cation membranes are SELEMION ® CMV and strongly acidic permselective membranes available from Asahi Glass Co. Other commercially available cation membranes such as Dupont's Nafion ® acidic fluorocarbon membranes, especially Nafion ® 110, 901, and 324 may also be used. In the operation, a direct current passes from the anode 400 to the cathode 401. Dilute sulfuric acid in a line 436 is fed to an acid compartment A formed by a cation face of a bipolar membrane 431a and an anion permselective membrane 433. In acid compartment A, hydrogen ions ($H^+$) are introduced from the bipolar membranes 431a and 431b. At the same time, hydrogen ions migrate through the anion permselective membrane 433 towards the cathode 401 and sulfate anions ($SO_4^{--}$) migrate through the anion permselective membrane 433 from the salt compartment S to the acid compartment A. As a result an enriched sulfuric acid solution is formed in the acid compartment A and removed via a line 438. Simultaneously at least a portion of an aqueous ammonium solution in line 434 is fed to the salt compartment S via a line 434s. The salt compartment S is formed by a face of an anion permselective membrane 433 and a face of a cation permselective membrane 435. In salt compartment S, ammonium ions migrate through the cation membrane 435 from salt compartment S to the base compartment B simultaneously, sulfate anions ($SO_4^{--}$) the migrate from salt compartment S to the acid compartment A. In addition, hydrogen ions ($H^+$) migrate from the acid compartment to the salt compartment S to form a solution of ammonium hydrogen sulfate and ammonium sulfate which is removed via a line 442. Water from a line 446, which may also contain ammonium hydroxide, is fed through a line 443b to a base compartment B formed by a face of a cation permselective membrane 435 and an anion face of a bipolar membrane 431b. Hydroxide ions ($OH^-$) formed at the bipolar membrane 431b combine with ammonium ions, which migrate from the salt compartment S through cation membrane 435 to the base compartment B to form an ammonium hydroxide and ammonium sulfate containing solution which is removed from the base compartment B via line 414. In a preferred embodiment of the process, the remainder of the ammonium sulfate solution in line 434 is fed via a line 434b to the base compartment B.

The operation of the three-compartment electrodialytic water splitter illustrated in FIG. 5 is described herein. The three-compartment electrodialytic water splitter is formed by alternating bipolar membranes 531a and 531b and anion permselective membranes 533a and 533b, thereby forming alternating acid, salt and base compartment positioned between an anode 500 and a cathode 501. The anion membranes are preferably strongly basic anion membranes, such as AMV strongly basic anion exchange membranes available from Asahi Glass. Weakly basic anion membranes may be used without departing from the scope of the present invention, but they provide lower overall current efficiency and higher cell voltage.

A direct current is passed from the anode 500 to the cathode 501. Dilute aqueous sulfuric acid obtained from the sulfuric acid plant is fed via a line 536 to the acid compartment A (formed by the cation face of the bipolar membrane 531a and a face of the anion permselective membrane 533a. In the acid compartment A hydrogen ions formed at the face of the bipolar membrane 531a combine with sulfate ions which migrate from the salt compartment S through anion permselective membrane 533a into the acid compartment A, to form a more concentrated sulfuric acid solution which is then removed via a line 538. Aqueous ammonium sulfate solution supplied by a line 534 is fed into two lines 534a and 534b for supply to the salt compartment S and base compartment B, respectfully. Hydrogen ions migrage from the acid compartment A through anion permselective membrane 533a into salt compartment S. At the same time, sulfate ions migrate through anion permselective membranes 533b and 533a into the salt compartment S thereby producing an acidic ammonium sulfate therein which is removed therefrom via a line 542. In the base compartment B, hydroxide ions are added from the anion face of the bipolar membrane 531b, and, simultaneously, sulfate anions, migrate from the base compartment B into the acid compartment A. An ammonium hydroxide-enriched solution of ammonium sulfate formed in the base compartment B is removed via a line 514.

COMPARATIVE EXAMPLE 1

Sodium sulfate was converted into sulfuric acid and sodium hydroxide in a laboratory scale electrodialysis stack comprised of two unit cells. The active area of each membrane was 2.0 in$^2$. The unit cell is comprised of two compartments, an acid and a base formed by alternating single film bipolar membranes prepared in accordance with U.S. Pat. No. 4,024,043 and Asahi Glass Company CMV ® cation exchange membranes. The initial feed to the acid compartment was a 200 gpl (1.41M) sodium sulfate solution. The initial feed to the base compartment was 0.5N NaOH. During a six-hour experiment a solution containing 1.1M NaHSO$_4$ (in 0.31M Na$_2$SO$_4$) was produced in the acid compartment and a 1.1M NaOH solution was produced in the base compartment. The cumulative average current efficiency for sulfuric acid and sodium hydroxide production from sodium sulfate was 65.9%. The average unit cell potential was 3.25 volts at a current density of 100 amps/ft$^2$. This cell configuration is not applicable to the present process because the sulfuric acid product contains unconverted sodium sulfate. However, it is presented for the purpose of comparison with the following examples. Similar results are expected with cast and composite bipolar membranes.

EXAMPLE 2

Sodium sulfate was converted into sulfuric acid and caustic by bipolar membrane electrodialysis using the three-compartment unit cell shown schematically in FIG. 4. The bipolar membranes were produced in accordance with processes disclosed in U.S. Pat. Nos. 4,024,043, 4,083,768, 4,057,481 and 4,140,815, and AMV anion permselective and CMV strongly acidic cation permselective membranes (Asahi Glass Company) were used. The feed to the center (salt) compartment of the unit cell initially contained 200 gpl (1.41M) Na$_2$SO$_4$. The initial acid and base compartment feeds were 1N H$_2$SO$_4$ and 1N NaOH, respectively. After ten hours of operation, the final acid concentration was 2.1N H$_2$SO$_4$ and the final base concentration was 3.44N NaOH. The acid compartment current efficiency was 40.7% and the base compartment current efficiency was 83.6%. The acid compartment efficiency was lower than the base compartment efficiency because of hydrogen ion leakage from the acid to the salt compartment through the anion exchange membrane. Most of the hydrogen ion formed the weak acid NaHSO$_4$ (0.68M) in the salt compartment did not pass into the base compartment, thereby not decreasing the base current efficiency by direct neutralization. The current efficiency for acid (as bisulfate) in the salt compartment was 38.1% sodium bisulfate from the salt compartment was recycled to the acidifier 222 as shown in FIG. 2). Therefore, the total acid current efficiency for the three-compartment cell is 78.8% (acid plus salt compartment H$^+$ efficiencies). The average unit cell potential was 3.0 volts at a current density of 100 amps/ft$^2$. As is apparent three-compartment cells are preferable to two-compartment cells (Example 1) in regard to producing high current efficiencies when generating H$_2$SO$_4$ and NaOH from Na$_2$SO$_4$.

EXAMPLE 3

Ammonium sulfate was converted into sulfuric acid and ammonium hydroxide using bipolar membrane electrodialysis with a two-compartment unit cell shown schematically in FIG. 3. The bipolar membranes employed in Example 2 and AMV anion permselective (Asahi Glass Company) membranes were used. The initial acid compartment feed was 0.5N H$_2$SO$_4$ and the initial base compartment feed was 0.89M (NH$_4$)$_2$SO$_4$. After six hours operation the acid concentration was 1.0N H$_2$SO$_4$ and the base concentration was 0.83N NH$_4$OH (in 0.47M (NH$_4$)$_2$SO$_4$). The acid and base current efficiencies averaged 62%. The average unit cell potential was 2.5 volts at a current density of 100 amps/ft$^2$. This cell configuration produces low current efficiencies when strong bases (NaOH) are produced because of migration of OH$^-$ through the anion membrane into the acid compartment.

EXAMPLE 4

Ammonium sulfate was converted into sulfuric acid and ammonium hydroxide using bipolar membrane electrodialysis with a three-compartment cell. The unit cell was the same as described in Example 2 and is shown schematically in FIG. 4. The bipolar membranes, as described in Example 2, and AMV anion permselective and CMV cation permselective (Asahi Glass Company) membranes were used. The starting feed in the center (salt) compartment was 1.2M (NH$_4$)$_2$SO$_4$. The starting feeds in the acid and base compartments were 0.5N H$_2$SO$_4$ and 1.2M (NH$_4$)$_2$SO$_4$, respectively. After six hours the final acid concentration was 1.0N H$_2$SO$_4$, which corresponds to a current efficiency of 62.5%. The center compartment contained 0.28M NH$_4$HSO$_4$ in in 0.16M (NH$_4$)$_2$SO$_4$ due to passage of hydrogen ion from the acid to the salt compartment through the anion exchange membrane. The total acid current efficiency, including H$^+$ from ammonium bisulfate in the salt compartment, was 80.0%. The final base concentration was 1.0N NH$_4$OH (in 1.2M (NH$_4$)$_2$SO$_4$) which corresponds to a current efficiency of 82.6%.

The average unit cell potential was 2.6 volts at a current density of 100 amps/ft².

EXAMPLE 5

Ammonium sulfate was converted into sulfuric acid and ammonium hydroxide using bipolar membrane electrodialysis with a three-compartment unit cell shown schematically in FIG. 5. The bipolar membranes and Asahi AMV anion permselective membranes as described in Example 3 were used. The initial feed to the center (salt) compartment was 1.2M $(NH_4)_2SO_4$. The initial feeds to the acid and base compartments were 0.5N $H_2SO_4$ and 1.2M $(NH_4)_2SO_4$, respectively. The final acid concentration after six hours of operation was 1.01N $H_2SO_4$, which corresponds to a current efficiency of 65.5%. The $NH_4HSO_4$ concentration in the salt compartment at the end of the experiment was 0.27M $NH_4HSO_4$, which corresponds to 20.3% acid current efficiency. Therefore, the total acid current efficiency was 85.8%. The final base concentration was 1.3N $NH_4OH$ which corresponds to a current efficiency of 82.5%. The average unit cell potential drop was 3.1 volts at a current density of 100 amps/ft². This cell configuration produces low current efficiencies when strong bases (NaOH) are produced because of $OH^-$ migration through the anion exchange membrane. The three-compartment unit cells of Examples 4 and 5 provided a higher total acid current efficiency than the two-compartment cell of Example 3 in the recovery of ammonium sulfate for recycle. The three-compartment unit cell of Example 5 provided a higher total acid current efficiency than the three-compartment cell of Example 4 because the AMV anion exchange membrane exhibits a higher resistance than the CMV cation exchange membrane.

COMPARATIVE EXAMPLE 6

Electrolysis can be applied to scrubber liquor recovery in a manner analogous to bipolar membrane electrodialysis. Ammonium sulfate was converted to sulfuric acid and ammonium hydroxide using electrolysis in a three-compartment cell similar to that disclosed in U.S. EPA Report No. 650/2-74-1266b (1974), "B" cell in FIG. 3 at page 1119 and in FIG. 2 of U.S. Pat. No. 4,041,129. The cell configuration was the same as in Example 5 for electrolysis, except that the bipolar membranes were replaced by smooth platinum electrodes. The compartment feeds were identical to those in Example 5. Oxygen (in addition to $H^+$) was produced at the anode and hydrogen (in addition to $OH^+$) was produced at the cathode. The final acid concentration after six hours operation was 1.12N $H_2SO_4$, which corresponds to a current efficiency of 40/2%. The $NH_4HSO_4$ concentration in the center compartment at the end of the experiment ws 0.174M, which corresponds to 12.4% acid current efficiency. Therefore, the total acid current efficiency was 52.6%. The final base concentration was 0.742M $NH_4OH$ which corresponds to a current efficiency of 49%. The average cell potential was 5.2 volts at a current density of 100 amps/ft². The power consumption for electrolysis under these conditions is considerably higher than for bipolar membrane electrodialysis of Example 5 because a higher voltage drop and a lower current efficiency required to generate $O_2$, $H^+$, $H_2$, and $OH^-$ by the electrolysis of water. The capital costs are also generally higher for electrolysis than for bipolar membrane electrodialysis, principally because of the high cost of the many required anodes which must be periodically replaced.

EXAMPLE 7

Figure 6:
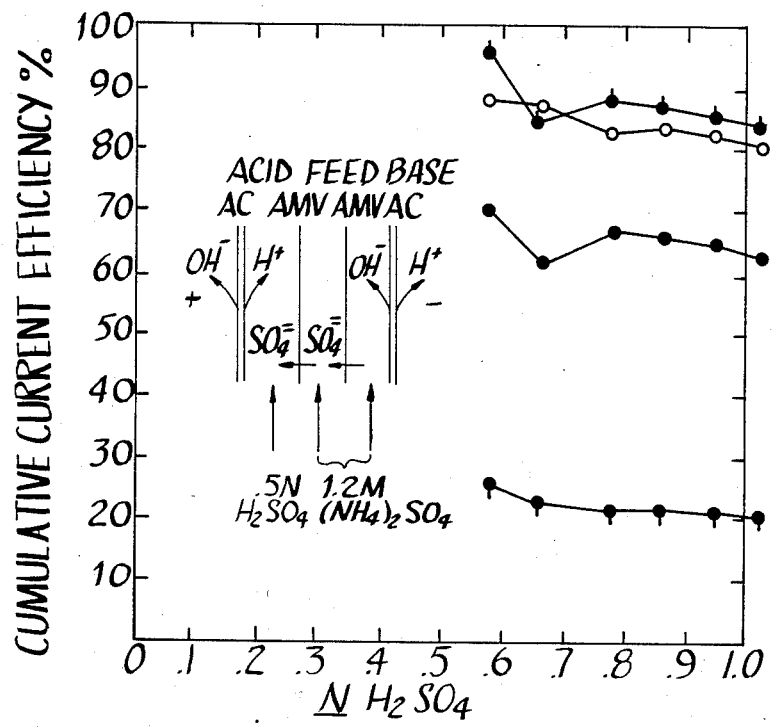
FIG. 6 graphically illustrates the variation of the cumulative current efficiency with increasing sulfuric acid concentration for a preferred embodiment of the present invention using three-compartment electrodialytic water splitting.
Figure 7:
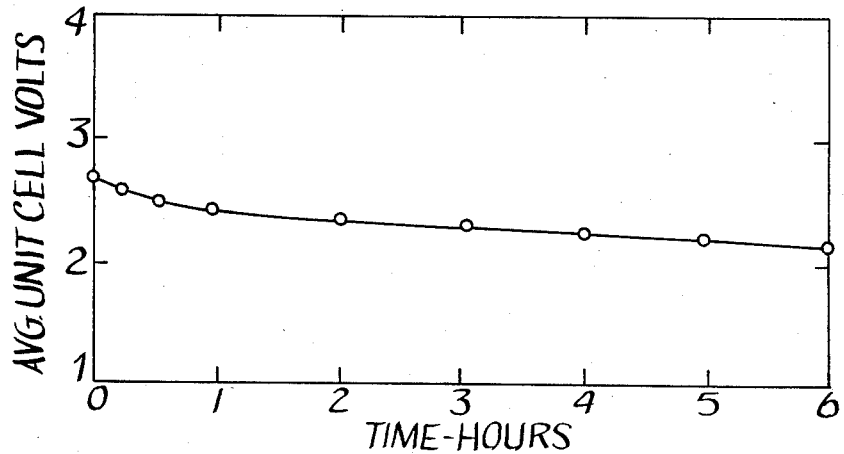
FIG. 7 graphically illustrates the variation of average unit cell voltage with increasing time for the preferred embodiment of the present invention of FIG. 6.

The apparatus and procedure of Example 5 were used except that a cast bipolar membrane, prepared in accordance with the procedure of U.S. Pat. No. 4,116,889, was used in place of a single film bipolar membrane. After a six-hour experiment, a solution containing 1.0M$(NH_4)_2SO_4$ was produced in the acid compartment, a solution containing 1.2M$(NH_4)_2SO_4$ and 0.29N$H_2SO_4$ was produced in the salt compartment and a solution containing 1.2M $(NH_4)_2SO_4$ and 1.21.NNH$_4$OH was produced in the base compartment. The total current efficiency for acid production was 83.1% and for ammonium hydroxide production was 79.6%. The average unit cell potential after 6 hours was 2.25 volts at a current density of 100 amps/ft. These results are graphically illustrated in FIGS. 6 and 7.

We claim:

1. A method for removing and recovering $SO_2$ and $SO_3$ from gases, and regenerating the process liquors, which comprises the steps of:
   (a) contacting, in a first reaction zone, gases containing $SO_2$ and $SO_3$ with a reaction liquid comprising aqueous hydroxide to produce an aqueous salt solution containing aqueous soluble sulfites, bisulfites and sulfates, and a gas comprising water vapor and depleted in $SO_2$ and $SO_3$;
   (b) contacting, in a second reaction zone, said aqueous salt solution with a reaction liquid comprising sulfuric acid and water to form an aqueous solution comprising sulfurous acid and aqueous soluble sulfates;
   (c) separating the sulfurous acid from said aqueous solution by liberating $SO_2$ as a gas therefrom;
   (d) providing an electrodialytic water splitter comprising at least one unit cell, each unit cell comprising an acid and a base compartment;
   (e) feeding the liquid comprising aqueous soluble sulfates to the base compartment of the electrodialytic water splitter;
   (f) feeding a liquid comprising dilute aqueous sulfuric acid and substantially free of soluble sulfate salts to the acid compartment of the electrodialytic water splitter;
   (g) passing current through said electrodialytic water splitter to produce a liquid enriched in sulfuric acid in the acid compartment, and a liquid comprising aqueous hydroxide in the base compartment.

2. The method of claim 1 further comprising the steps of:
   (h) forwarding at least a portion of the liquid enriched in sulfuric acid to said second reaction zone; and
   (i) forwarding said liquid comprising aqueous soluble hydroxide to said first reaction zone.

3. The method is described in claim 1 wherein the reaction liquid comprising aqueous soluble hydroxide contains at least one member selected from the group consisting of $Na^+$, $Li^+$, $K^+$ and $NH_4^+$.

4. The method as described in claim 1 wherein the reaction liquid comprising aqueous soluble hydroxide contains $Na^+$.

5. The method as described in claim 3 wherein the liquid comprising aqueous soluble hydroxide contains $NH_4^+$.

6. The method as described in claim 29 wherein the electrodialytic water splitter is a two compartment water splitter comprising alternating bipolar and anion permselective membranes thereby forming alternating base and acid compartments, the base compartment being formed by an anion face of a bipolar membrane and a face of an anion permselective membrane and the acid compartment being formed by a cation face of a bipolar membrane and a face of an anion permselective membrane.

7. The method as described in claim 1 wherein the electrodialytic water splitter is a three-compartment water splitter comprising alternating bipolar, anion permselective and cation permselective membranes thereby forming alternating acid, salt and base compartments, the salt compartment being formed by a face of an anion permselective membrane and by a face of a cation permselective membrane, the base compartment being formed by a face of a cation permselective membrane and anion face of a bipolar membrane and the acid compartment being formed by a cation face of a bipolar membrane; and wherein the process further comprises liquid feeding comprising aqueous soluble sulfates to the salt compartment.

8. The method as described in claim 1 wherein the electrodialytic water splitter is a three-compartment water splitter comprising alternating bipolar, first anion permselective and second anion permselective membranes thereby forming alternating acid, salt and base compartments, the salt compartment being formed by a face of each of the first and second anion permselective membranes, the base compartment being formed by a face of an anion permselective membrane and an anion face of a bipolar membrane and the acid compartment being formed by a cation face of a bipolar membrane and a face of an anion permselective membrane; and wherein the process further comprises the step of feeding liquid comprising aqueous soluble sulfates to the salt compartment.

9. A method of claim 1 wherein the gases are sulfuric acid tail gases.

10. The method of claim 1 further comprising the step of forwarding the remainder of liquid enriched in sulfuric acid to a sulfuric acid plant.

11. The method of claim 1 further comprising the step of forwarding the $SO_2$ gas to a sulfuric acid plant.

12. The method as described in claim 1 wherein $SO_2$ is separated from said aqueous acid solution by passing air through said aqueous solution under conditions of temperature and pressure sufficient to liberate $SO_2$ gas.

13. A method for removing and for recovering $SO_2$ and $SO_3$ from gases, and regenerating process liquors which comprises the steps of:
(a) contacting, in a first reaction zone, gases containing $SO_2$ and $SO_3$ with a reaction liquid comprising aqueous hydroxide to produce an aqueous salt solution containing soluble sulfites, bisulfites, and sulfates, and a gas comprising water vapor and depleted in $SO_2$ and $SO_3$;
(b) contacting, in a second reaction zone, said aqueous salt solution with a reaction liquid comprising sulfuric acid and water to form an aqueous acid solution comprising sulfurous acid and aqueous soluble sulfates;
(c) separating the sulfurous acid from the aqueous acid solution be liberating $SO_2$ as a gas therefrom;
(d) providing an electrodialytic water splitter comprising at least one unit cell, each unit cell comprising an acid, base and salt compartment;
(e) feeding at least a portion of said aqueous soluble sulfate to the salt compartment of the three-compartment electrodialytic water splitter;
(f) feeding a liquid comprising water to the base compartment of said electrodialytic water splitter;
(g) feeding a liquid comprising dilute aqueous sulfuric acid and substantially free of soluble sulfate salts to the acid compartment of said electrodialytic water splitter;
(h) passing current through said electrodialytic water splitter to produce a liquid enriched in sulfuric acid in the acid compartment, a liquid comprising aqueous hydrogen ions and soluble sulfate in the salt compartment and a liquid comprising aqueous soluble hydroxide in the base compartment;
(i) forwarding at least a portion of the liquid enriched in sulfuric acid to the second reaction zone; and
(j) forwarding the liquid comprising aqueous soluble hydroxide to the first reaction zone.

14. The method of claim 13 wherein the reaction liquid comprising aqueous hydroxide contains at least one member selected from the group consisting of $Na^+$, $Li^+$, $K^+$ and $NH_4^+$.

15. The method of claim 13 wherein the reaction liquid comprising aqueous hydroxide contains $Na^+$.

16. The method of claim 13 further comprising the step of forwarding the liquid comprising aqueous hydrogen ions and soluble sulfates to the second reaction zone.

17. The method of claim 13 wherein each unit cell of the three-compartment electrodialytic water splitter comprises alternating bipolar, anion permselective and cation permselective membranes which form said acid, salt and base compartment.

18. The method of claim 16 wherein the liquid fed to the base compartment further comprises aqueous sodium hydroxide.

19. The method of claim 17 wherein the liquid fed to the base compartment also comprises the liquid comprising aqueous sodium sulfate.

20. The method of claim 13 wherein the aqueous hydroxide is ammonium hydroxide and wherein the liquid comprising the aqueous hydroxide further comprises aqueous ammonium sulfate.

21. The method of claim 13 wherein each unit cell of the three-compartment electrodialytic water splitter comprises alternating bipolar, a first anion permselective and a second anion permselective membrane thereby forming said alternating salt acid and base compartment S.

22. The method of claim 20 wherein the aqueous ammonium sulfate in the liquid fed to the base compartment comprises the remainder of the aqueous ammonium sulfate separated in step (c), and wherein the liquid withdrawn from the base compartment comprises aqueous ammonium hydroxide and aqueous ammonium sulfate.

23. The method of claim 13 wherein the $SO_2$ gas is separated from the aqueous acid solution by passing air through said acid solution to remove the $SO_2$.

* * * * *

UNITED STATES PATENT AND TRADEMARK OFFICE
CERTIFICATE OF CORRECTION

PATENT NO. : 4,552,635
DATED : November 12, 1985
INVENTOR(S) : T. J. Jenczewski, W. H. Skinner, Jr.

It is certified that error appears in the above-identified patent and that said Letters Patent are hereby corrected as shown below:

```
Claim 21, line 5, insert --,-- after "salt"
         line 6, change "compartment" to --compartments--
                 and delete "S"
```

Signed and Sealed this

Thirteenth Day of May 1986

[SEAL]

Attest:

Attesting Officer

DONALD J. QUIGG

Commissioner of Patents and Trademarks